United States Patent
Dumanowski et al.

[15] 3,656,488
[45] Apr. 18, 1972

[54] TURNOVER SHAKER

[72] Inventors: Ferdinand J. Dumanowski, Sunnyvale; William G. Malley, San Jose; David W. Cayton, Cupertino, all of Calif.

[73] Assignee: FMC Corporation, San Jose, Calif.

[22] Filed: July 29, 1970

[21] Appl. No.: 59,268

[52] U.S. Cl. ............................................130/30 A, 171/14
[51] Int. Cl. ...............................................................A01d
[58] Field of Search.....................171/14, 28, 130; 130/30 R, 130/30 A; 56/327; 209/308, 420; 198/84

[56] References Cited

UNITED STATES PATENTS

| | | | |
|---|---|---|---|
| 3,294,094 | 12/1966 | Dreyer | 130/30 R |
| 1,800,622 | 4/1931 | Granberg | 171/14 |
| 3,340,935 | 9/1967 | Csimma | 171/14 |
| 1,998,912 | 4/1935 | Troy | 198/84 |
| 2,604,972 | 7/1952 | Schmied | 198/84 |

FOREIGN PATENTS OR APPLICATIONS 1,162,648  9/1958  France.....................................171/130

*Primary Examiner*—Antonio F. Guida
*Attorney*—F. W. Anderson and C. E. Tripp

[57] ABSTRACT

Tomatoes or the like are removed from a mass of vines and tomatoes by advancing and shaking the mass to detach some of the fruit, dropping the mass while turning it over, advancing the inverted mass along a second path in a direction opposite that of the first path while further shaking the inverted mass for detaching additional fruit. These steps are carried out on endless shaking conveyors that are oscillated by rotating kicker bar assemblies. An undershaker conveyor is disposed beneath the lower reach of each of the shaker conveyors and runs in the direction of that reach. The lower shaker conveyor extends past the delivery end of the upper shaking conveyor for facilitating the turning over action between the shakers. Sickle bars are provided at the delivery end of each shaker conveyor for cutting up vines and preventing them from being picked up by their associated undershaker conveyors.

16 Claims, 4 Drawing Figures

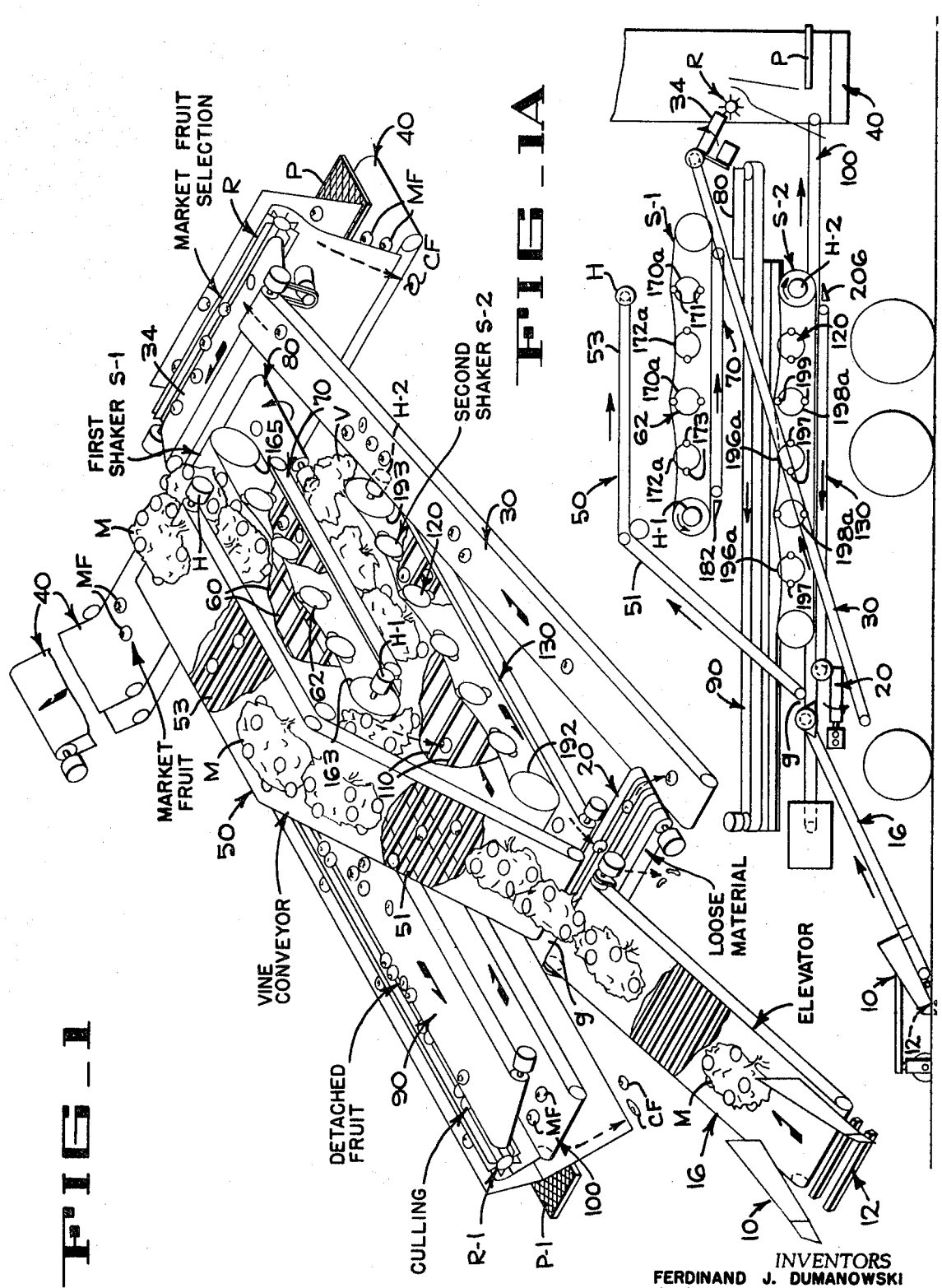

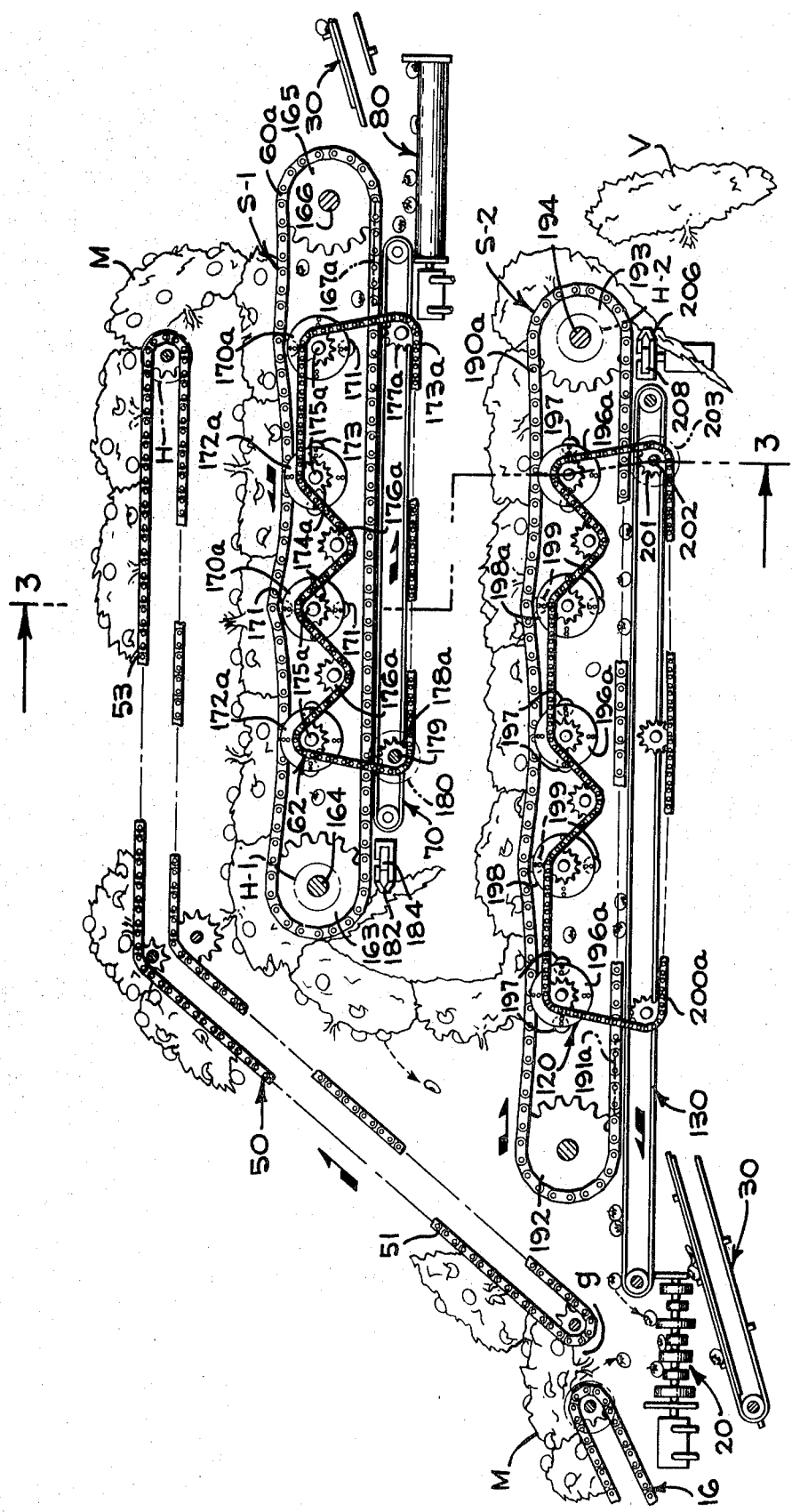

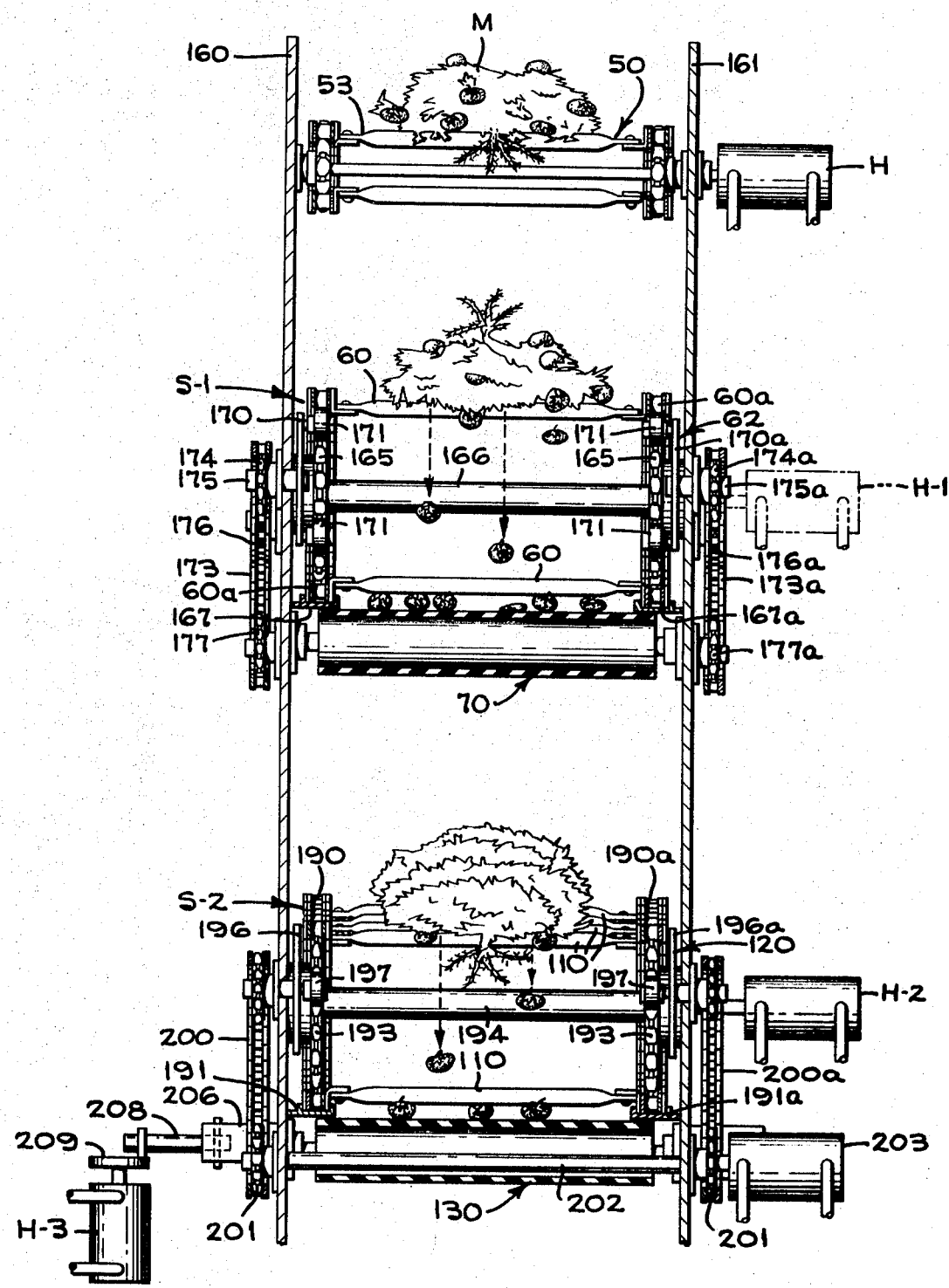

TURNOVER SHAKER

REFERENCE TO RELATED APPLICATIONS

A harvesting machine embodying the shaker of the present invention is disclosed and claimed in the copending application of Cayton and Malley, Ser. No. 49,415 filed June 24, 1970, SJ 5592, now U.S. Pat. No. 3,613,796, issued Oct. 19, 1971; assigned to the FMC Corporation.

A two-stage oscillating shaker with a tumbling action between stages is disclosed and claimed in the application of Walker, Ser. No. 848,499, filed Aug. 8, 1969 and assigned to the FMC Corporation.

DESCRIPTION OF PRIOR ART

Dutch Pat. No. 56,132 issued Apr. 15, 1944 shows serially arranged fruit separating conveyors running in the same direction.

German Pat. No. 1,072,422, issued Dec. 31, 1959 shows serially arranged shakers running in the same direction.

Good U.S. Pat. No. 2,454,156, issued Nov. 16, 1948 describes a peanut picker having superposed oscillating vine and peanut shaking bars.

Wyborney U.S. Pat. No. 701,529, issued June 3, 1902 shows elliptical beaters in a peanut harvester that are 90° out of phase.

Aspinwall, U.S. Pat. No. 1,341,454 issued May 25, 1920 has a triangular rotating kicker bar shaker in a linked belt potato digger.

Silver U.S. Pat. No. 1,657,414 issued Jan. 24, 1928 shows triangular kicker bar shakers on a linked belt endless screen conveyor, with a lower reach of the conveyor supported.

Wheeler U.S. Pat. No. 1,814,992, issued July 14, 1931 shows a triangular rotating kicker bar assembly oscillating the upper reach of a potato digger conveyor.

Johnston U.S. Pat. No. 2,577,525, issued Dec. 4, 1951 shows diametrically arranged kicker rollers and oscillating rails that support the upper reach of a slat conveyor in a potato digger.

Peto et al. U.S. Pat. No. 3,070,944, issued Jan. 1, 1963 shows rotating disc elements for shaking the belts of a tomato harvester.

Zachery U.S. Pat. No. 3,106,249, issued Oct. 8, 1963 shows a triangular conveyor shaker in a potato harvester operating on a linked belt-type conveyor.

SUMMARY OF THE INVENTION

Harvester Installation

Although the shaker of the present invention has more general utility, it will be described in conjunction with the use for detaching tomatoes from the mass of vines and fruit such as that picked up in the field by a tomato harvester.

Superposed endless shaker conveyors are provided which are longitudinally offset and running in opposite directions with the delivery end of the upper shaker conveyor overlying the receiving end of the lower shaker conveyor. A mass of vines and fruit is delivered to the upper shaker conveyor and a shaking action is imparted to the upper reach of that conveyor which detaches some of the fruit. The detached fruit is collected by an undershaker conveyor that runs adjacent the lower reach of the upper shaker conveyor and in the same direction thereof. This insures almost immediate removal and collection of the fruit detached early in the shaking cycle, which tends to be ripe and hence more fragile fruit.

When the fruit is deposited onto the second shaker conveyor from the first, due to the fact that the fruit drops a substantial distance and that the conveyors run in opposite directions, the mass is turned over. This inversion places fruit which was formerly at the top of the mass on the second shaker conveyor. This insures substantially complete removal of all fruit from the mass. The undershaker conveyor for the second shaker conveyor is beneath the lower reach of the latter and runs in the same direction. This makes it possible to extend the lower undershaker conveyor past the vine receiving end of the shaker conveyor for separate collection of detached fruit.

The lower reaches of the two shaker conveyors are supported on rails above their respective undershaker conveyors. Ample slack can be produced in the upper reach of each shaker conveyor for sinuous oscillation by rotating kicker rollers. Wear on the chain links and on the shaker conveyor parts is minimized and there is little tendency to vibrate the entire harvester despite the effective shaking action.

In order to prevent vines leaving the ends of the two shaker conveyors from wrapping around the delivery pulleys for pickup by the associated undershaker conveyor beneath those pulleys, sickle bars are provided which cut up the vines at these zones.

DETAILED DESCRIPTION OF THE DRAWINGS

FIG. 1 is a diagrammatic perspective of a tomato harvester embodying the present invention.

FIG. 1A is a diagrammatic side view of the harvester showing the geometrical relationship of the parts.

FIG. 2 is a side elevation of a shaker assembly embodying the invention.

FIG. 3 is a vertical section taken on line 3—3 of FIG. 2.

PREFERRED EMBODIMENT

The shaker of the present invention is illustrated in FIGS. 1 and 1A as installed in a tomato harvester such as that of the copending application of Cayton et al., Ser. No. 49,415 filed June 24, 1970, (SJ 5592) now U.S. Pat. No. 3,613,796, issued Oct. 19, 1971. It will be noted that the harvester embodies a split flow or selective arrangement. An initial mass M of vine-attached tomatoes, loose tomatoes, clods and some dirt is picked up from the field by a digger mechanism 10 including weeder bars 12 and carried over to an elevator conveyor 16.

The loose material falls through a gap "g" onto a screening conveyor 20 which deposits the material on a side conveyor 30. The screening conveyor 20 forms the subject matter of the copending application of Walker, Ser. No. 66,512, filed Aug. 24, 1970, (SJ 5627). The loose material is subjected to an inspection and sorting operation at a rear sorting reel R which picks up the material from a distribution conveyor 34. Here the culls CF drop automatically to the ground and the market fruit MF is transferred manually by sorters on a platform P to a collecting conveyor 40. The sorting reel forms the subject matter of the copending application of Cayton et al., Ser. No. 49,415, filed June 24, 1970, (SJ 5592), now U.S. Pat. No. 3,613,796, issued Oct. 19, 1971.

Under the present invention, the remaining mass of vines and attached fruit which bridges the gap "g," is picked up by a vine conveyor 50 having an elevator section 51 and a horizontal section 53 and driven by a hydraulic motor H. The mass continues on to a double or turnover shaker operation. Fruit is first detached by a shaker conveyor S–1 having slats 60 and a kicker assembly 62. The detached fruit is collected by an undershaker conveyor 70 and carried to a rear cross conveyor 80. The latter drops the detached fruit onto a side sort distribution conveyor 90 for a separate culling operation. Culls CF are manually removed by sorting operators on a platform P–1, at a side sort reel R–1 and the market fruit MF automatically passes on to the collection conveyor 40 via a side conveyor 100.

Under the present invention, the mass on shaker conveyor S–1 runs forwardly of the harvester. The vines are then turned over and the remaining fruit is detached by a second stage shaker conveyor S–2 having slats 110 and a kicker assembly 120. The fruit thus detached drops onto an undershaker conveyor 130 which, in turn, introduces it into the separate loose material inspection system at the screening conveyor 20, previously mentioned. Thus, the fruit from the first stage shaker conveyor S–1, after having been presented for culling at the side sort reel R–1, is combined with the loose fruit (including that from the second shaker conveyor S–2) after the loose fruit has been automatically culled at the rear sorting reel R, for delivery by the conveyor 40 to a truck or trailer that moves along the field alongside of the harvester.

Shaker Conveyor Details

FIGS. 2 and 3 illustrate various details of the shaker conveyors S–1, S–2 of the present invention. The shaker conveyor assembly is mounted between side plates 160, 161 (FIG. 3) mounted on the associated elements of the harvester frame (not shown) in any convenient manner. The shaker S–1 slats 60 are mounted on side chains 60a that are trained over drive pulleys 163 (one appearing in FIG. 2) mounted on a shaft 164 in the framework and driven by a hydraulic motor H–1. Chains 60a are also trained over idler pulleys 165 mounted on a shaft 166 in the framework. The upper reach of the chains 60a and the slats 60 move forwardly in the machine.

The chains at the lower reach of the upper shaker conveyor are supported on rails 167,167a (FIG. 3) so that the flight bars 60 just clear the upper reach of the undershaker conveyor 70. This reduces wear of the parts as well as providing for ample slack in the upper reach for oscillation by the kicker bar assembly 62. These rails have been broken away in FIG. 2 for clarity of illustration.

The undershaker conveyor 70 is driven at the same linear speed as that of the shaker conveyor S–1. Thus fruit shaken from the mass on the upper reach of the shaker conveyor S–1 falls between the shaker slats 60 down onto the upper reach of the undershaker conveyor 70 and is carried rearwardly by the undershaker conveyor at the same speed as that of the slats 60 of the lower reach of the shaker conveyor S–1. As mentioned, this fruit is discharged by the undershaker conveyor 70 to the laterally running collector conveyor 80 at the rear of the harvester.

The upper right of FIG. 2 shows how the mass of vines and fruit deposited from the horizontal reach 53 of the conveyor 50 drops onto the rear end of the shaker conveyor S–1, and that this end is close to the transverse collector conveyor 80. Thus ripe fruit (which is most likely shaken off first) or fruit that is so ripe that it has been detached by previously handling up to this point, fall through the shaker conveyor S–1 and down onto the lower reach of the undershaker 70 at the delivery end of the latter. This deposits ripe fruit onto the collector conveyor 80 almost immediately, and hence minimizes handling of the very fruit that is the most fragile.

As previously mentioned, in order to provide the shaking action required for the upper reach of the shaker conveyor S–1, the kicker bar assembly 62 is provided. As seen in FIG. 2, the kicker bar assembly comprises two pairs of opposed, rotating discs 170,170a (one pair appearing in FIG. 3), each of which mounts a pair of kicker rollers 171. In the position of the discs illustrated in the drawings, the rollers 171 (which are diametrically opposed) are disposed in the vertical plane. Adjacent the two pairs of discs 170,170a are two pairs of discs 172,172a (FIG. 2) having kicker rollers 173, but these rollers in the position illustrated in FIG. 2 are in the horizontal plane, that is, in a plane at 90° to the plane containing the kicker rollers 171. Thus, synchronous rotation of the disc-mounted rollers will produce an undulating or sinusoidal vibration of the upper reach of the shaker conveyor. The discs 170,170a and 172,172a are simultaneously rotated by drive chains 173,173a which are trained over sprockets 174,174a on corresponding stub shafts 175,175a that mount the roller discs. Idler sprockets 176a are disposed between some of the discs for improving the drive. Also provided is a lower rear set of idler sprockets 177,177a and drive sprockets 178,178a (only the sprocket 178a being shown in FIG. 2) mounted on a drive shaft 179, (FIG. 2). The shaft 179 for the drive sprockets 178,178a is driven by a hydraulic motor 180 shown in phantom in FIG. 2.

As mentioned, since the lower reach of the shaker conveyor S–1 has its side chains supported on rails 167,167a (FIG. 3), ample slack can be provided on the upper reach of the conveyor chains. As a result, the sinuous oscillation imparted to the chains for detaching fruit, is accomplished without unduly tensioning and wearing the chain links.

In order to prevent vines that tumble off the delivery (forward) end of the shaker conveyor S–1 from wrapping around that conveyor instead of falling onto the lower shaker conveyor S–2, a sickle bar assembly is provided. This assembly comprises a stationary knife blade 182 and a reciprocating knife blade 184 (FIG. 2), the latter being reciprocated by a hydraulic motor and an eccentric drive arrangement (not shown), in accordance with conventional sickle bar practice.

The lower shaker conveyor S–2 has a construction similar to that of the upper shaker conveyor, except that the parts run in the opposite direction and are displaced forwardly relative to the upper shaker. The lower shaker conveyor includes side chains 190,190a connected by the flights on slats 110 previously described and spaced along chains in the manner of the flights 60 of the upper conveyor. The chains 190,190a at the lower reach of the conveyor are supported on rails 191,191a (FIG. 3) as in the case of the upper shaker conveyor. The conveyor chains 190,190a run over idler pulleys 192 (one appearing in FIG. 2) and driving pulleys 193 mounted on a shaft 194 driven by a hydraulic motor H–2. The lower reach of the shaker conveyor S–2 runs at the same speed as the upper reach of the undershaker conveyor 130, for moving fruit along the latter conveyor for deposit upon the screening conveyor 20 as previously described.

The kicker bar assembly 120 for the lower shaker conveyors is substantially the same as the kicker assembly 62 just described and hence will be only mentioned briefly. Since the lower shaker conveyor is somewhat longer, its upper reach is supported by five roller mounting discs, including three pairs of discs 196,196a having rollers 197 disposed in the horizontal plane in the position illustrated in FIG. 2, and intermediate discs 198,198a with rollers 199 disposed at 90° to the other rollers, that is, in the vertical plane as shown in FIG. 8. The roller mounting discs are rotated on stub shafts by chains 200,200a which pass over idlers much in the manner of the assembly 62 just described. These chains are driven by drive sprockets 201, a drive shaft 202 and a hydraulic motor 203 (FIG. 3).

A sickle bar, including a fixed blade 206 and an oscillating blade 208 is mounted beneath the vine delivery end of the lower shaker S–2 (FIGS. 2 and 3). As seen in FIG. 3 the moveable sickle blade 208 is driven by an eccentric 209 and a hydraulic motor H–3, this being the type of drive (not shown) provided for the upper sickle bar 182, 184 previously described.

As seen in FIG. 2, with the undershaker conveyors 70 and 130 being completely beneath and clear of their associated shaker conveyors, the shaft mountings, assembly and disassembly are simplified and the assembly is vertically compact. Also, the lower undershaker conveyor 130 can run forwardly past the lower shaker conveyor S–2 for delivery to the dirt belt 20, resulting in simplification of the conveyor system.

Operation

The operation of the shaker conveyors S–1, S–2 is as follows:

A mass of vines and attached fruit M is carried rearwardly above the upper shaker S–1 by the horizontal section 53 of the elevator conveyor 50. As seen at the upper right of FIG. 2, this mass is dropped off onto the rearward, fruit receiving end of the upper shaker conveyor S–1. The ripe and easily detached fruit are shaken clear almost immediately and hence fall through the upper reach of the shaker conveyor S–1 and onto the undershaker conveyor 70 at latter's delivery end. Hence this fruit reaches the transverse collector conveyor 80 early in the first shaking cycle. As the mass of fruit and vines is carried forwardly on the upper reach of the shaker conveyor S–1, more fruit is detached, dropping through the slats or flights 60 onto the upper reach of the undershaker conveyor 70. This fruit is likewise deposited on the conveyor 80, as previously described.

During the passage of the material along the upper reach of the shaker S–1, fruit resting on the top of the mass does not receive as effective a shaking action as that resting against the conveyor flights. However, as the mass is tumbled over the delivery end of the undershaker conveyor and falls onto the receiving end of the lower shaker conveyor, moving in the opposite direction, the effect is to turn the mass over. Now fruit that was formerly at the top of the mass will be adjacent its bottom. Thus the fruits that were not previously directly accessible for shaking or were quite firmly attached, will be vigorously worked upon by the lower shaker conveyor S–2. Hence by the time the mass has reached the delivery end of the shaker S–2, almost all of the fruit that remained after the shaking will have been detached and delivered to the undershaker conveyor 130. This will include a good percentage of the green fruit.

Also, some fruit will have been detached from the vines on the first shaker S–1 but will not have worked its way down through the mass on the first shaker and hence will be on or near the top of the mass as the latter tumbles onto the second shaker. Such fruit, indicated at LF in FIG. 2, drops clear of the mass and falls free and clear onto the second shaker S–2 near its receiving end. This fruit falls through the second shaker before traversing it, and hence enters the collection system almost immediately.

The vines V are dropped off of the rear end of the lower shaker conveyor S–2 and returned to the ground. As mentioned, the sickle bar assembly 206,208 prevents wrap-around of the vines at this point and so prevents their being picked up and carried to the screening conveyor 20 by the undershaker conveyor 130. Also, as previously mentioned, the fruit that is removed by the lower shaker conveyor S–2 tends to be the green or under-ripe fruit which also tends to be fruit of the smallest size. Since this fruit is delivered to the screening conveyor 20, the smaller fruit will be dropped off at the latter conveyor. If the green fruit is not small enough to be dropped out at the screening conveyor 20, it will be automatically carried out by the reel R at the market fruit selection station, as was also explained in detail previously.

Typical Example

By way of example and in order to describe the best mode of operation of the invention now known, typical operating characteristics of the machine just described will be presented. When employed as a tomato harvester, the machine can move down a row of tomatoes at about 0.75 to 1.5 mph, 1.25 mph being a typical speed.

Shaker Conveyors S–1 and S–2 — Peripheral speed 132 and 154 ft/min. respectively.

Kicker bar wheels and shakers — 200 rpm.

Although the above-given exemplary operating characteristics are satisfactory for the field harvesting of tomatoes, it will be appreciated that these speeds are given by way of example only and that they can be adjusted to various field conditions, particularly when it is understood that most of the parts are driven by hydraulic motors, the speeds of which can be individually and independently controlled.

Although the best mode contemplated for carrying out the present invention has been herein shown and described, it will be apparent that modification and variation may be made without departing from what is regarded to be the subject matter of the invention.

We claim:

1. Material shaking apparatus for detaching objects such as fruit or the like from vines comprising superposed shaker conveyors having shaking elements that advance the material in opposite directions, the material receiving end of the lower shaker conveyor projecting a substantial distance past the material discharge end of the upper shaker conveyor, the material discharge end of the upper shaker conveyor being spaced sufficiently above the material receiving end of the lower shaker conveyor to accommodate turning over of the material as it is discharged onto the lower shaker conveyor, and means for collecting objects shaken from each shaker conveyor.

2. The apparatus OF CLAIM 1, wherein said collecting means comprises an undershaker conveyor disposed beneath the upper shaker conveyor, and conveyor means for delivering the material to be shaken directly to the upstream end portion of said upper shaker conveyor.

3. The apparatus of claim 1, wherein each shaker conveyor comprises endless side chains mounting a series of transverse flight bars, and means for vertically oscillating only the upper reach of said side chains and flight bars.

4. The apparatus of claim 3, wherein said flight bar oscillating means comprises a row of laterally aligned, rotating kicker means engaging said conveyor side chains for imparting a sinuous motion to the flight bars as they advance over said kicker means.

5. The apparatus of claim 4, comprising rail means for supporting the lower reaches of said conveyor side chains.

6. The apparatus of claim 2, comprising means below the discharge end of each shaker conveyor for cutting up vines or the like that tend to enter between each shaker conveyor and its undershaker conveyor.

7. The apparatus of claim 6, wherein said vine cutting means comprises a sickle bar.

8. The apparatus of claim 1, wherein said detached object collecting means comprises a separate collection means for each shaker conveyor.

9. The apparatus of claim 1, wherein the undershaker conveyor for said lower shaker conveyor runs past the vine receiving end of the latter.

10. Shaking apparatus for a vine crop mass or the like comprising means for advancing the mass along a first path, means for shaking the mass along said first path for initially detaching objects from the mass, means for dropping the mass and turning it over at the end of said first path, means for advancing the inverted mass along a second path below the first path and in a direction opposite to that of said first path, the mass receiving end of said first path extending past the mass dropping end of said second path for receiving said inverted mass, and means for shaking the inverted mass on said second path for detaching objects from adjacent the bottom of the mass which were formerly adjacent the top of the mass.

11. The apparatus of claim 10, wherein said two shaking means each comprises an endless conveyor having transverse flights and means for vertically oscillating the upper reach of each conveyor.

12. The method of detaching fruit or the like from a mass of the fruit and vines or the like comprising the steps of advancing the mass along a generally horizontal first path while shaking the mass to detach some fruit or the like, dropping the remaining mass at the end of said path while turning the mass upside down, advancing the inverted mass along a generally horizontal second path in a direction opposite to that of said first path while shaking the inverted mass to detach additional fruit or the like from the mass, and collecting the fruit or the like detached along both paths.

13. The method of claim 12, comprising the steps of advancing the fruit collected from each shaking path in a direction opposite to that of the path.

14. The method of claim 12, comprising the steps of separately collecting the fruit detached along said two shaking paths.

15. The method of claim 12, comprising the steps of removing collected fruit or the like detached at the mass receiving end of said first path substantially as soon as it is detached.

16. Shaking and collecting apparatus for vine crop fruit comprising an endless shaker conveyor having upper and lower reaches, a crop receiving end and a vine discharge end, an endless undershaker conveyor disposed beneath and close to the lower reach of said shaker conveyor, the upper reach of said undershaker conveyor running with the lower reach of said shaker conveyor, and transverse sickle bar means beneath the lower reach of the vine discharge end of said shaker conveyor and upstream of the associated end of said undershaker conveyor for cutting vines and preventing their entering the undershaker conveyor.

* * * * *